United States Patent
Major et al.

(10) Patent No.: US 9,716,916 B2
(45) Date of Patent: Jul. 25, 2017

(54) ADAPTIVE MULTICAST DELIVERY OF MEDIA STREAMS

(71) Applicant: ECHOSTAR TECHNOLOGIES L.L.C., Englewood, CO (US)

(72) Inventors: Robert Drew Major, Orem, UT (US); Mark B. Hurst, Cedar Hills, UT (US); Herrick Muhlestein, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 14/144,235

(22) Filed: Dec. 30, 2013

(65) Prior Publication Data

US 2014/0189754 A1   Jul. 3, 2014

Related U.S. Application Data

(60) Provisional application No. 61/746,776, filed on Dec. 28, 2012.

(51) Int. Cl.
| | |
|---|---|
| *H04N 7/173* | (2011.01) |
| *H04N 21/647* | (2011.01) |
| *H04N 21/643* | (2011.01) |
| *H04L 29/06* | (2006.01) |
| *H04N 21/2343* | (2011.01) |

(Continued)

(52) U.S. Cl.
CPC ... *H04N 21/64738* (2013.01); *H04L 65/4076* (2013.01); *H04L 65/602* (2013.01); *H04N 21/23439* (2013.01); *H04N 21/643* (2013.01); *H04N 21/6405* (2013.01); *H04N 21/6408* (2013.01); *H04N 21/64322* (2013.01); *H04N 21/8456* (2013.01)

(58) Field of Classification Search
CPC combination set(s) only.
See application file for complete search history.

(56) References Cited

U.S. PATENT DOCUMENTS

| | | | |
|---|---|---|---|
| 5,935,206 A | 8/1999 | Dixon et al. | |
| 6,195,680 B1 | 2/2001 | Goldszmidt et al. | |

(Continued)

FOREIGN PATENT DOCUMENTS

| | | | |
|---|---|---|---|
| WO | 2007030813 A2 | 3/2007 | |
| WO | WO 2009035466 A1 * | 3/2009 | |
| WO | 2011034955 A2 | 3/2011 | |

OTHER PUBLICATIONS

U.S. Patent and Trademark Office, Non-Final Office Action, dated Nov. 3, 2014 for U.S. Appl. No. 13/707,008.

(Continued)

*Primary Examiner* — William J Kim
(74) *Attorney, Agent, or Firm* — LK Global

(57) ABSTRACT

Various systems, methods and devices adaptively manage the multicast delivery of multiple media programs. Each of the media programs is encoded into multiple media streams, each stream having a different bitrate, frame rate, resolution or other encoding parameter. A computer receives feedback about the delivery of the multiple streams and automatically adapts the number of streams available for at least one of the multiple media programs in response to the received feedback. This allows resources to be applied to those multicast streams having the greatest user demand.

17 Claims, 3 Drawing Sheets

Figure 1:
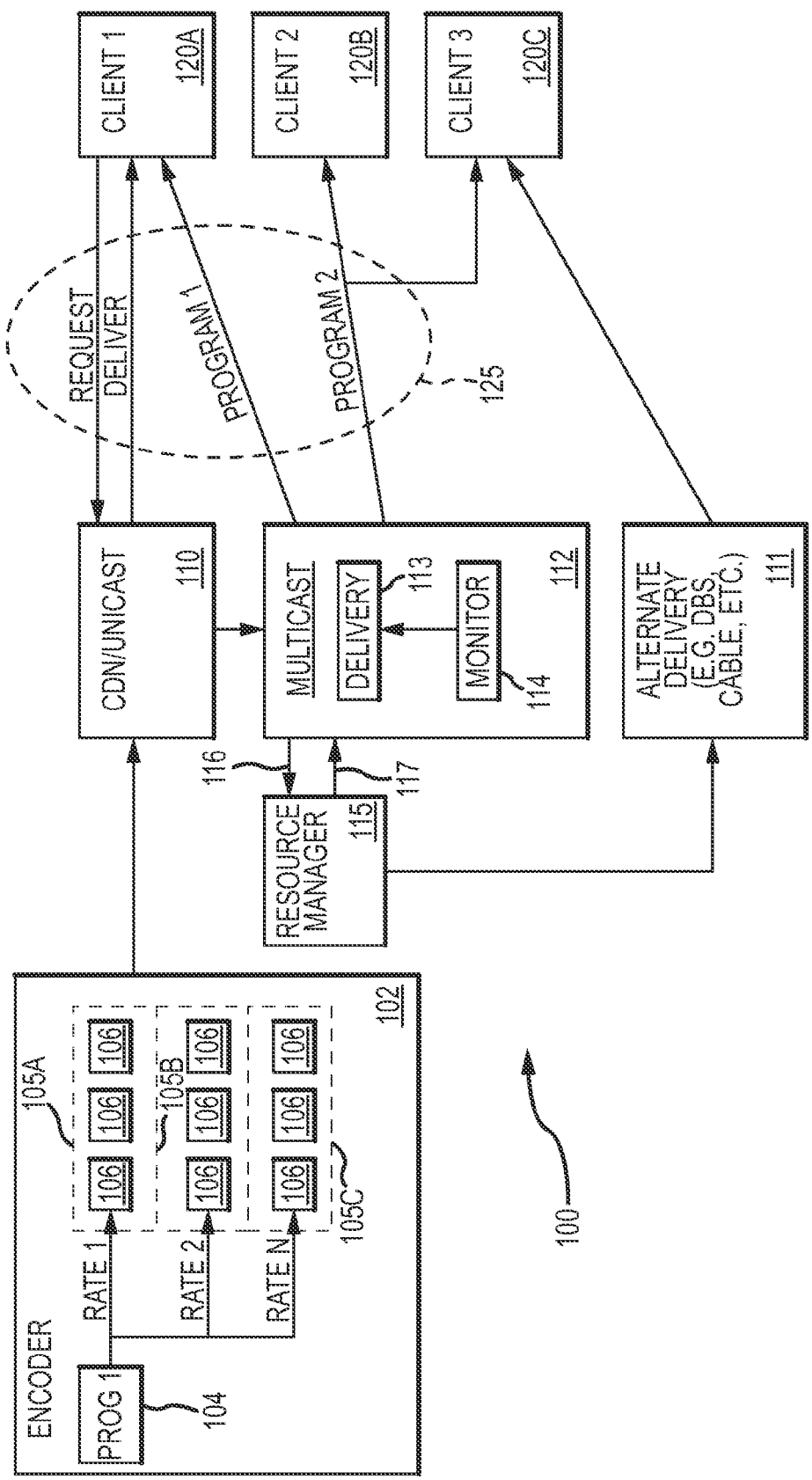

(51) Int. Cl.
  *H04N 21/6405* (2011.01)
  *H04N 21/6408* (2011.01)
  *H04N 21/845* (2011.01)

(56) References Cited

U.S. PATENT DOCUMENTS

| | | | |
|---|---|---|---|
| 6,973,081 B1* | 12/2005 | Patel | H04L 12/1881 |
| | | | 370/390 |
| 7,474,832 B2 | 1/2009 | Boston et al. | |
| 7,584,495 B2 | 9/2009 | Hannuksela et al. | |
| 7,603,022 B2 | 10/2009 | Putterman et al. | |
| 7,624,412 B2 | 11/2009 | McEvilly et al. | |
| 7,739,239 B1 | 6/2010 | Cormie et al. | |
| 7,770,200 B2 | 8/2010 | Brooks et al. | |
| 8,181,206 B2 | 5/2012 | Hasek | |
| 8,238,725 B2 | 8/2012 | Demas et al. | |
| 8,532,171 B1* | 9/2013 | Narayanan | H04N 21/8451 |
| | | | 375/240.01 |
| 8,681,680 B2 | 3/2014 | Mao et al. | |
| 8,787,975 B2 | 7/2014 | Kanojia et al. | |
| 9,071,484 B1* | 6/2015 | Truax | H04L 29/06027 |
| 9,100,700 B2 | 8/2015 | Major et al. | |
| 2002/0046405 A1* | 4/2002 | Lahr | 725/87 |
| 2003/0204519 A1 | 10/2003 | Sirivara et al. | |
| 2003/0208767 A1 | 11/2003 | Williamson et al. | |
| 2005/0002337 A1 | 1/2005 | Wang et al. | |
| 2005/0191033 A1 | 9/2005 | Ishido | |
| 2005/0233694 A1 | 10/2005 | Enari et al. | |
| 2005/0275752 A1 | 12/2005 | Li et al. | |
| 2005/0289618 A1 | 12/2005 | Hardin | |
| 2006/0020984 A1 | 1/2006 | Ban et al. | |
| 2006/0053078 A1 | 3/2006 | Yamamoto et al. | |
| 2006/0117090 A1 | 6/2006 | Schellingerhout et al. | |
| 2007/0036516 A1 | 2/2007 | Kahn et al. | |
| 2007/0083667 A1* | 4/2007 | Cooper | 709/231 |
| 2007/0107019 A1 | 5/2007 | Romano et al. | |
| 2007/0118857 A1 | 5/2007 | Chen et al. | |
| 2007/0124245 A1 | 5/2007 | Sato et al. | |
| 2008/0013919 A1 | 1/2008 | Boston et al. | |
| 2008/0092168 A1 | 4/2008 | Logan et al. | |
| 2008/0127284 A1 | 5/2008 | Kouniniotis | |
| 2008/0201748 A1 | 8/2008 | Hasek et al. | |
| 2008/0310825 A1 | 12/2008 | Fang et al. | |
| 2009/0025027 A1* | 1/2009 | Craner | H04H 20/103 |
| | | | 725/32 |
| 2009/0074380 A1 | 3/2009 | Boston et al. | |
| 2009/0080582 A1 | 3/2009 | Loeffler et al. | |
| 2009/0080864 A1 | 3/2009 | Rajakarunanayake | |
| 2009/0144285 A1 | 6/2009 | Chatley et al. | |
| 2009/0144416 A1 | 6/2009 | Chatley et al. | |
| 2009/0187948 A1 | 7/2009 | Malik | |
| 2009/0265426 A1 | 10/2009 | Svendsen et al. | |
| 2009/0282162 A1 | 11/2009 | Mehrotra et al. | |
| 2010/0114921 A1 | 5/2010 | Bocharov et al. | |
| 2010/0131671 A1 | 5/2010 | Kohli et al. | |
| 2010/0153227 A1 | 6/2010 | Medvinsky et al. | |
| 2010/0153237 A1 | 6/2010 | LaJoie et al. | |
| 2010/0242079 A1 | 9/2010 | Riedl et al. | |
| 2010/0250549 A1 | 9/2010 | Muller et al. | |
| 2010/0319044 A1 | 12/2010 | Agans et al. | |
| 2011/0035507 A1 | 2/2011 | Brueck et al. | |
| 2011/0083144 A1 | 4/2011 | Bocharov et al. | |
| 2011/0107379 A1* | 5/2011 | Lajoie | H04L 65/1016 |
| | | | 725/87 |
| 2011/0126248 A1* | 5/2011 | Fisher | H04N 7/17318 |
| | | | 725/95 |
| 2011/0138431 A1 | 6/2011 | Cedervall et al. | |
| 2011/0173345 A1 | 7/2011 | Knox et al. | |
| 2011/0188439 A1* | 8/2011 | Mao et al. | 370/312 |
| 2011/0225315 A1 | 9/2011 | Wexler et al. | |
| 2011/0296048 A1 | 12/2011 | Knox et al. | |
| 2012/0054312 A1 | 3/2012 | Salinger | |
| 2012/0079546 A1 | 3/2012 | Kalidindi et al. | |
| 2012/0128061 A1* | 5/2012 | Labrozzi | H04N 21/23435 |
| | | | 375/240.02 |
| 2012/0144302 A1 | 6/2012 | Campanotti et al. | |
| 2012/0219273 A1 | 8/2012 | McWilliams | |
| 2012/0293605 A1 | 11/2012 | Seferian et al. | |
| 2012/0317655 A1 | 12/2012 | Zhang et al. | |
| 2012/0324489 A1 | 12/2012 | Greenfield | |
| 2012/0331106 A1 | 12/2012 | Ramamurthy et al. | |
| 2013/0013688 A1 | 1/2013 | Wang et al. | |
| 2013/0013704 A1 | 1/2013 | Pope et al. | |
| 2013/0089142 A1 | 4/2013 | Begen et al. | |
| 2013/0097309 A1 | 4/2013 | Ma et al. | |
| 2013/0111606 A1 | 5/2013 | Gu | |
| 2013/0142499 A1 | 6/2013 | Major et al. | |
| 2013/0145392 A1 | 6/2013 | Major et al. | |
| 2013/0145408 A1 | 6/2013 | Major et al. | |
| 2013/0145410 A1 | 6/2013 | Major et al. | |
| 2013/0145411 A1 | 6/2013 | Major et al. | |
| 2013/0145415 A1 | 6/2013 | Major et al. | |
| 2013/0159544 A1 | 6/2013 | Cooper | |
| 2013/0254341 A1 | 9/2013 | Ramakrishnan | |
| 2013/0254538 A1 | 9/2013 | Orsini et al. | |
| 2014/0189099 A1 | 7/2014 | Hurst et al. | |
| 2014/0189143 A1 | 7/2014 | Muhlestein | |
| 2014/0237534 A1 | 8/2014 | Salinger et al. | |
| 2014/0250473 A1 | 9/2014 | Braness et al. | |
| 2014/0317652 A1 | 10/2014 | Tam | |

OTHER PUBLICATIONS

U.S. Patent and Trademark Office, Notice of Allowance, dated Nov. 6, 2014 for U.S. Appl. No. 13/706,983.
Microsoft, How NTFS Works, Mar. 28, 2003, http://technet.microsoft.cornien-us/library/cc781134(v=ws.10).aspx.
T. Berners-Lee, "Hypertext Transfer Protocol—HTTP/1.1," Jun. 1999; retrieved from the Internet on Apr. 10, 2013 from http://www.w3.org/protocols, Chapters 5, 6, and 10.
European Patent Office "International Search Report and Written Opinion" dated Jun. 7, 2013 for International Appln. No. PCT/US2012/067796.
US Patent and Trademark Office, Non-Final Office Action, dated Sep. 13, 2013 for U.S. Appl. No. 13/707,008.
US Patent and Trademark Office, Non-Final Office Action, dated Sep. 20, 2013 for U.S. Appl. No. 13/707,022.
US Patent and Trademark Office, Non-Final Office Action, dated Sep. 25, 2013 for U.S. Appl. No. 13/707,031.
US Patent and Trademark Office, Non-Final Office Action, dated Oct. 2, 2013 for U.S. Appl. No. 13/707,044.
US Patent and Trademark Office, Final Office Action mailed Jan. 15, 2014 for U.S. Appl. No. 13/707,008.
US Patent and Trademark Office, Office Action mailed Sep. 10, 2013 for U.S. Appl. No. 13/706,983.
US Patent and Trademark Office, Final Office Action mailed Jan. 10, 2014 for U.S. Appl. No. 13/706,983.
USPTO, Notice of Allowance and Fee(s) Due for U.S. Appl. No. 13/837,058 mailed Feb. 3, 2015.
USPTO, Notice of Allowance and Fee(s) Due for U.S. Appl. No. 13/706,993 mailed Feb. 27, 2015.
USPTO, "Office Action" dated Aug. 21, 2014 for U.S. Appl. No. 13/706,993.
USPTO, "Notice of Allowance and Fee(s) Due" dated Aug. 25, 2014 for U.S. Appl. No. 13/706,983.
U.S. Patent and Trademark Office, Non-Final Office Action, dated Oct. 9, 2014 for U.S. Appl. No. 13/837,058.
U.S. Patent and Trademark Office, Notice of Allowance, dated May 23, 2014 for U.S. Appl. No. 13/707,044.
U.S. Patent and Trademark Office, Notice of Allowance, dated May 27, 2014 for U.S. Appl. No. 13/707,022.
European Patent Office, International Search Report and Written Opinion, dated Apr. 17, 2014 for International Application No. PCt/US2013/078358.
Wikipedia, the free encyclopeida, Adaptive Bitrate Streaming, Sep. 24, 2014; retrieved from the Internet at http://en.wikipedia.org/w/index.php?title=Adaptie_bitrate_streaming@oldid=528192400.
USPTO, Notice of Allowance mailed Mar. 4, 2014 for U.S. Appl. No. 13/707,031.

(56)  References Cited

OTHER PUBLICATIONS

USPTO, Final Office Action mailed Mar. 12, 2014 for U.S. Appl. No. 13/707,044.
USPTO, Final Office Action mailed Mar. 13, 2014 for U.S. Appl. No. 13/707,022.
USPTO, Non-final Office Action mailed Mar. 6, 2014 for U.S. Appl. No. 13/706,983.
USPTO, Office Action for U.S. Appl. No. 14/145,115 mailed Aug. 21, 2015.
USPTO, Notice of Allowance and Fee(s) Due for U.S. Appl. No. 13/707,008 mailed Mar. 4, 2015.
The International Bureau of WIPO, International Preliminary Report on Patentability for International Application No. PCT/US2013/078358 mailed Jul. 9, 2015.
USPTO, Office Action in U.S. Appl. No. 14/792,485 mailed Dec. 18, 2015.
USPTO Notice of Allowance, U.S. Appl. No. 14/792,485, Issued on May 4, 2016.
Anonymous, "Text of ISO/IEC 2nd DIS 23009-1 Dynamic Adaptive Streaming over HTTP", 97, MPEG Meeting; Jul. 18, 2011-Jul. 22, 2011; Torino; (Motion Picture Expert Group or ISO/IEC JTC1/SC29/WG11), No. N12166, Sep. 6, 2011.
EPO Search Report, EP Application No. 12801787.8, Dated Jun. 6, 2016.
Non-Final Office Action, U.S. Appl. No. 15/247,147, Issued Feb. 8, 2017.

* cited by examiner

ADAPTIVE MULTICAST DELIVERY OF MEDIA STREAMS

PRIORITY CLAIM

This application claims priority to U.S. Provisional Application Ser. No. 61/746,776 filed on Dec. 28, 2012, which is incorporated herein by reference.

TECHNICAL FIELD

The present disclosure generally relates to multicasts of media streams, and more particularly relates to systems, devices and methods to adaptively provide multicasts of media segment streams.

BACKGROUND

Streaming media is becoming more and more popular with consumers. At present, a variety of streaming audio, video and/or other media content is available to consumers from any number of diverse unicast and multicast sources. So-called "Internet television", for example, is typically provided as a multicast stream using conventional Internet protocols. Media streams are also used to provide other types of network-based media content, as well as live and pre-recorded broadcast television, content-on-demand, stored media content (e.g., content stored in a remotely-located digital video recorder (DVR), placeshifted media content and the like.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate). Several examples of adaptive streaming systems and techniques are described in US Patent Publication No. 2008/0195743, which is incorporated herein by reference.

While this adaptability does allow a relatively flexible form of media delivery, it can create challenges because multiple copies of each program typically need to be made available to the client at the same time. That is, the client needs to be able to switch between high-bandwidth or lower bandwidth streams on relatively short notice, so both high and low bandwidth streams need to be readily available. Often, more than two streams are provided for each program so that the client application has more options in selecting the appropriate bandwidth for the then-current conditions. Providing the multiple copies of each program stream can quickly consume available resources such as network bandwidth, encoder capabilities, storage space on a file server, and the like.

The resource consumption issue is quickly compounded in the multi-cast setting where multiple users simultaneously receive the same content, since the differently-encoded copies of the same program all need to be made available to each of the different users at the same time. It is therefore desirable to create systems and methods to reliably and conveniently manage available resources while providing multiple multicast media streams to customers. These and other desirable features and characteristics will become apparent from the subsequent detailed description and the appended claims, taken in conjunction with the accompanying drawings and this background section.

BRIEF SUMMARY

Various exemplary embodiments provide client or server systems, processing devices and/or techniques to adaptively manage the multicast delivery of multiple media programs. Typically, each of the media programs is encoded into a plurality of media streams, each stream having different encoding parameters than the other streams of the same media program. Real-time or other feedback information about the delivery of the multiple media programs is received, and the number of streams available for at least one of the multiple media programs is adapted in response to the received feedback. Some implementations may receive the feedback information in real time so that changes in the available streams can be made in response to changing network conditions, changing viewer demand, and/or other factors as desired. This allows network resources to be efficiently allocated where they can provide the most benefit for the most users.

Various embodiments, aspects and other features are described in detail below.

BRIEF DESCRIPTION OF THE DRAWING FIGURES

Figure 2:
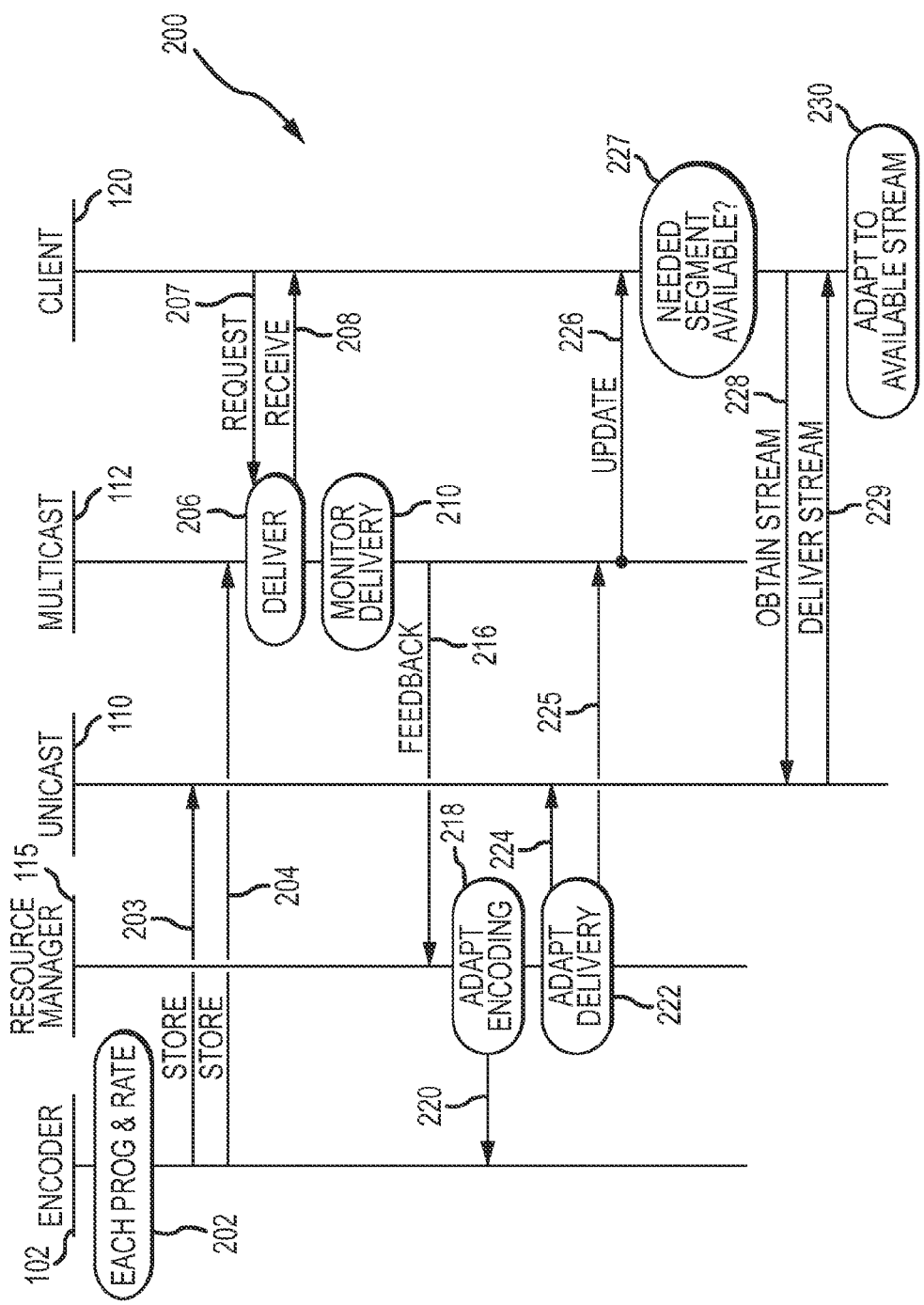
Figure 3:
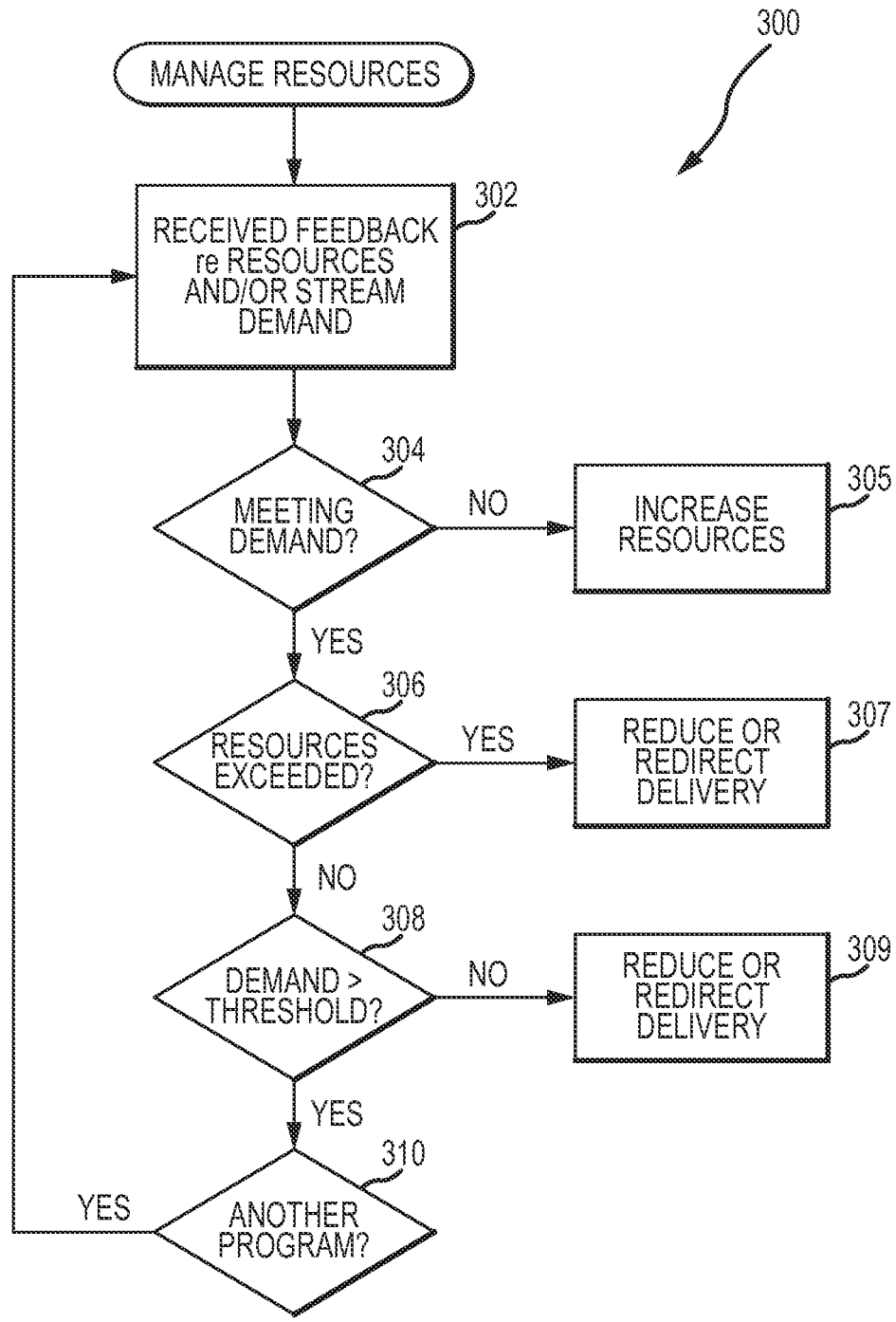

Exemplary embodiments will hereinafter be described in conjunction with the following drawing figures, wherein like numerals denote like elements, and FIG. 1 is a block diagram of an exemplary system for adaptively managing the multicast delivery of multiple media streams;

FIG. 2 is a message flow diagram showing an exemplary process for adaptively managing the multicast delivery of multiple media streams; and FIG. 3 is a flowchart of an exemplary process executable by a resource management system for adaptively managing network resources in a multicast media delivery environment.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

As noted above, reliable multicast delivery of adaptive video streams can consume substantial network bandwidth, encoder resources, file storage, and/or other resources. Conventionally, multiple multicast streams of the same program having different encoding parameters (e.g., bit rate, frame rate, resolution, etc.) were simultaneously provided for each media program. That is, each program would typically be simultaneously multicast as a high bandwidth stream, a low bandwidth stream and/or any number of intermediate bandwidth streams. Client media players operated by viewers simply tuned in to the program stream having the best set of parameters for then-current playback conditions. If a playback began to lag, then the media player would typically switch to a lower bandwidth stream (e.g., a stream having lower bit rate, frame rate, resolution and/or other parameters). When conditions were able to support a higher bandwidth stream, then the player would adaptively switch to a different stream that contained the same programming encoded with different parameters. Again, however, this typically requires multiple simultaneous multicasts of each program, since each program needs to be available at different bandwidths for different clients. The multiple streams for each of the multiple programs can consume a relatively large amount of bandwidth very quickly.

Various embodiments are able to effectively manage network resources during multicast delivery by temporarily discontinuing certain streams in response to then-current network conditions and/or in response to customer demand. Rather than simply providing a full range of different-bandwidth copies of each program at all times, a computer can automatically select only those streams that are actually in demand, or that have the greatest demand. Copies of programs having little or no demand can be temporarily suspended to make resources available to other streams. Viewers of suspended streams can be redirected to use streams having different parameters (e.g., a slightly higher or lower bandwidth stream containing the same program), and/or to obtain the stream from another source. Real-time feedback about then-current demand for the various streams can therefore be used to ensure that those streams having the greatest demand receive an adequate allocation of resources, thereby improving the user experience for the greater share of then-current users.

Turning now to the drawing figures and with initial reference to FIG. 1, an exemplary system 100 to adaptively manage the multi-cast delivery of media streams suitably includes an encoder 102, a multicast delivery server 112, and a resource management system 115. Various embodiments may additionally include a unicast delivery server 110 and/or an interface 111 to an alternate delivery system (e.g., cable television, broadcast television, direct broadcast satellite (DBS), and/or the like). The various components shown in FIG. 1 may be jointly provided by a common service provider, or different service providers may work together to provide different components of the system 100. A television network or other content provider could provide content that is already encoded in the appropriate formats, for example, thereby obviating the need for a separate encoder 102 in some implementations. Similarly, unicast and/or multicast hosting could be performed by any sort of content delivery network (CDN) or other service, as appropriate. Still further, the resource management service 115 could be equivalently combined into the encoder 102, the multicast hosting service 112, and/or any other service as desired.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C that each represent a media program 104 in its entirety. Typically, each stream 105A-C is made up of smaller segments 106 that represent a small portion of the program in a single data file. Each stream 105A-C is typically encoded so that segments 106 of the different streams 105A-C are interchangeable with each other. That is, a client media player 120A-C can mix and match segments 106 from different streams 105A-C to continue seamless playback even as network conditions or other resources change.

For unicast (one-to-one) distribution, the sets of segments 106 making up each stream 105 are stored on a content delivery network (CDN) or other server for distribution on the Internet or another network 125. Typically, a media player application executing on one or more client devices 120A-C contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 120 initially obtains a digest or other description of the available segments so that the player itself can request the segments 106 as needed. Often, such requests can be processed using conventional hypertext transport protocol (HTTP) constructs that are readily routable on network 125 and that can be served by conventional CDN or other web-type servers 110. Media player 120 may issue conventional HTTP "get" instructions for particular segment files 106 hosted by a CDN 110, for example. CDN 110 would respond with the appropriate segment files 106 using conventional HTTP "put" statements, as appropriate.

In a multicast setting, client devices 120A-C similarly obtain encoded segments 106 from a service 112 via network 125. Typically, however, multicast segments 106 are simultaneously pushed to multiple client devices 120A-C. The media player at the client device 120 retains some control over the received content, however, by switching between different streams 105A-C of segments 106 as needed. That is, multicast server 112 provides simultaneous streams 105 of segments 106 for each program being broadcast so that the different client devices 120A-C are each able to obtain segments 106 of the program with the appropriate encoding parameters for the then-current conditions, as determined by client devices 120A-C. Again, this typically entails service 112 providing multiple simultaneous streams 105 for each program 104 so that the various devices 120A-C can switch between any of the available streams 105A-C as needed.

Multicast server 112 suitably includes appropriate computer hardware (e.g., a processor, memory and input/output interfaces) executing appropriate software to support the various functions described herein. Delivery function 113 may be implemented using, for example, conventional web server, media streaming and multi-casting techniques and structures (e.g, HTTP or the like). Multicast server 112 also provides a monitoring function 114 that can be used to provide feedback 116 to the resource management service 115. In various embodiments, function 114 tracks which streams 106 for the various programs 104 are being used or not used so that unused or lightly-used streams 106 can be identified. Demand for each stream 105A-C may be identified by tracking the number of HTTP requests received for segments 106 associated with each stream, or in any other manner. Function 114 may alternately or additionally track network bandwidth, processor utilization and/or other resources that could impact delivery of multi-cast streams 106 to clients 120A-C, and this information could be incorporated into feedback 116.

Resource management service 115 is a computerized service that automatically adapts the multicast delivery of media streams 105 in response to feedback information 116. In many implementations, resource management service 115 executes on a conventional digital computer that includes a processor, memory, input/output interfaces and the like. Some embodiments may perform the resource management function of service 115 with the same hardware used to perform the encoding and/or multicast delivery functions, as desired. Resource manager 115 as shown in FIG. 1 could be equivalently combined with unicast server 110, multicast server 112, encoder 102 and/or other services as desired.

When feedback information 116 indicates that one or more streams are unused (or only lightly used), then lightly-used stream may be temporarily (or permanently) discontinued from further delivery to conserve bandwidth or other resources. Similarly, when network bandwidth or other resources available to multicast delivery service 112 become constrained or otherwise unavailable, then the lesser-used streams may be temporarily or permanently discontinued to conserve the resources that are available.

In some embodiments, the encoding function may also be adapted to conserve encoding resources used in streaming live broadcast programming or the like. To that end, various embodiments allow real-time encoding of one or more streams 105A-C to be temporarily suspended to preserve resources for more popular streams 105A-C. This may be particular useful during multicasts of live broadcasts such as sporting events. If demand for a particular stream 105A-C is identified as being particularly low at a given time, for example, then encoding of that stream 105 could be temporarily suspended to preserve encoder capabilities for other, more popular streams 105.

The particular streams 105 that are discontinued may be determined in any manner. In some implementations, higher or intermediate bandwidth streams may be discontinued while a lower bandwidth stream remains available, thereby allowing viewers to continue watching the program 104, albeit at lower quality. Media player applications executing on client devices 120A-C may be notified of changes in the available streams 105 for a particular program 104 by sending a new digest, or through other in-band or out-of-band signaling as appropriate.

Some embodiments may further allow discontinued streams to be provided in alternate ways. A discontinued stream may be redirected from delivery over network 125 to delivery over a television service via interface 111, for example. In such embodiments, the client device 120A-C obtains the discontinued signal via a cable television, broadcast television, DBS or other signal as appropriate. In other implementations, the client device 120A-C receives an instruction to obtain the discontinued stream from a unicast source 110, if such a source is available that has access to the needed stream and program.

Streams may be discontinued in any manner; various embodiments may provide an instruction 117 to direct the delivery function to cease further delivery of the discontinued stream. In some implementations, delivery service 113 simply provides a predetermined code in response to HTTP requests for discontinued segments 106. The code could be, for example, an HTTP error code or the like that notifies the requesting client device that the requested stream 105 is no longer available. Further, some embodiments could configure client devices 120A-C to recognize alternate streams or sources of the suspended content from the received error codes. Rather than simply providing a "requested content not available" (e.g., HTTP 204/404 error), for example, server 112 could instead provide an error code that directs the client 120 to request a higher or lower bandwidth, or to obtain the content from an alternate source (e.g., unicast server 110, a television/cable/DBS broadcast, or any other source). Software executing on client devices 120A-C could therefore be configured to recognize particular error codes contained in HTTP or other responses provided by server 112, and to react accordingly.

FIG. 2 shows an exemplary process 200 for adapting multicast delivery of media streams. With reference now to FIG. 2, the encoder 102 suitably encodes the various programs 104 at each data rate (or other parameter) supported within system 100 (function 202). As noted previously, each program may be encoded into any number of different streams 105 having any number of different encoding parameters. The various streams 105 are then stored on a unicast server 110 (function 203) and/or multicast server 112 (function 204) as desired for delivery to the various clients 120, as desired.

The client 120 suitably obtains the appropriate media stream using conventional adaptive streaming techniques. In various embodiments, client 120 requests streamlets or other segments 106 of an appropriate stream 105 for a desired program 104, as desired. The particular segments 106 and/or streams 105 can be identified through a digest or other summary provided by the appropriate server 110, 112, or by another source as desired. In many implementations, the various segments 106 can be referenced using conventional uniform resource locators (URLs) or other addresses that conform to a standard format, or that are otherwise indicated in digest or similar summary. In such implementations, the client 120 suitably requests (function 207) the appropriate segment 106, and a delivery module 113 (function 206) of server 112 responds with the requested segment (function 208). The client 120 can request segments 106 corresponding to different programs 104 and/or other available streams 105 that are associated with the same program 104 as conditions warrant.

As noted above, multicast server 112 suitably monitors the streams 105 that are being delivered (function 210) so that feedback 216 can be provided to the resource manager 115. Generally, monitoring function 114 of the multicast server 112 is able to monitor which streams 105 are currently in use by tracking requests 207 and/or transmissions 208, as desired.

Feedback 216 suitably indicates the current state of multicast delivery to the resource manager 115. In various embodiments, feedback 216 reflects real time demand for the different streams 105 and/or the then current conditions of server 112 and/or network 115. Resource manager 115 processes the feedback data 216 to determine whether to adapt the encoding of the stream (function 218) and/or the delivery of the stream (function 222). In some implementations (e.g., when a live broadcast is encoded in real time as it is being streamed on network 125), the encoding of certain streams 105 can be suspended at least temporarily to conserve encoding or delivering capability. This could be accomplished by sending an instruction 220 to suspend encoding by encoder 112, as appropriate.

Even if the lower-demand stream 105 has already been encoded, however, it may still be beneficial to suspend delivery of the stream when conditions warrant. This may be accomplished by sending a message 225 to the multicast server 112, as appropriate. The resource manager 115 may also communicate with unicast server 110 (function 224) to suspend delivery of one or more streams, to notify the server 110 that certain streams 105 will no longer be available from multicast server 112, or for any other purpose. Server 112 will subsequently cease delivery of segments 106 associated with the suspended streams. Subsequent messages 225 could indicate that delivery of one or more suspended streams 105A-C should be restarted, as appropriate.

The delivery module 113 of multicast server 112 notifies relevant clients 120 when certain streams 105 are no longer available (function 226). This update may provide a new digest, or other information that lets client 120 become aware of other ways to obtain similar content (e.g., the same program encoded with different parameters). Equivalently, function 226 could involve providing an HTTP or similar code to the requesting client 120 in response to subsequent requests for suspended segments 106. As discussed above, the codes provided in response to such requests could be selected to provide clients 120A-C with additional information about how to obtain replacement content, as desired.

As noted above, it may be desirable in many instances to suspend higher bandwidth streams 105 (or intermediate bandwidth streams 105) of certain programs 104 since these will produce greater bandwidth savings. Even if a desired bandwidth stream 105 becomes unavailable (function 227), the client 120 may be able to nevertheless request a different stream 105 (function 228) to obtain a stream 105 that encodes the same program 104 with different encoder settings (e.g., at a slightly higher or lower bandwidth). The client 120 is therefore able to seamlessly adapt to the available streams 105 with little or no perceived interruption in the playback of the program 104 to the viewer (function 230). As noted above, other embodiments may alternately or additionally notify the client (e.g., with function 226) that the discontinued stream 105 is available from a unicast source (e.g., server 110) and/or from a different broadcast source (e.g., via cable, broadcast or DBS interface 111). The various functions shown in FIG. 2 may be supplemented, modified or differently ordered in any manner to create any number of equivalent embodiments.

Turning now to FIG. 3, an exemplary process 300 to manage resources in a multicasting streaming system 100 suitably includes various functions 302-310 that can be carried out using programmable software code executed by a computer system, such as resource management system 115. The software code used to implement the various functions may be stored in memory, disk storage or other non-transitory storage available to the computer system, and may be executed by any conventional microprocessor, microcontroller or other programmable circuitry. Equivalent embodiments may supplement, modify and/or differently arrange the various functions shown in FIG. 3 in any manner.

Process 300 suitably involves receiving real-time or other feedback data 116 from the multicast delivery service 112 (function 302). In many implementations, the feedback data 116 indicates the real-time demand for various streams 105, and/or otherwise indicates the then-current demands placed upon the multicast delivery service 112. If the then-current demand is not being met, then it may be desirable to increase resources for one or more streams by providing additional streams (function 305) of varying encoding parameters, or providing multiple copies of the highly-demanded stream.

Conversely, if the network bandwidth, server capacity or other computing resources are exceeded (function 306), then it may be beneficial to identify one or more streams 105 that can be discontinued or redirected (function 307). Various embodiments may consider whether sufficient server capacity and/or network bandwidth is available before increasing the number of streams in function 305. Such embodiments may also look for lower demand streams 105 of the same program or of a different program 104 that can be suspended to make extra resources available for high-demand streams 105. As noted above, suspended streams may be redirected for delivery via unicast or other channels in some implementations.

Even if sufficient resources do remain available, it may be desirable to suspend those streams that are currently experiencing low or no demand (function 308). In various embodiments, the number of current stream recipients can be compared to a threshold value to determine whether the stream should be continued. If the number of recipients dips below the threshold, then the stream may be suspended, and those clients 120 that are currently receiving the stream may be redirected to a different stream (e.g., a lower bandwidth stream) and/or a different source for the discontinued stream (function 309). Process 300 or any portion thereof may be repeated for any number of different programs 104 or streams 105 (function 310), as desired.

The foregoing discussion therefore considers whether particular streams 105A-C that are provided as part of a multicast streaming service can be adaptively managed to provide efficient use of server resources while still preserving better performance for most users. The general concepts set forth herein may be adapted to any number of equivalent embodiments. Although the discussion herein frequently considers network 125 to be the Internet or a similar network, for example, equivalent concepts could be applied to telephone, cable television, DBS networks and/or the like to allocate media streams distributed in those environments. Equivalent concepts could, for example, allocate bandwidth on a cable or DBS network according to monitored or estimated demand. Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a computer to adaptively manage the multicast delivery of a live media program to a plurality of client devices via a network, wherein the method comprises:

receiving the live media program by the computer for encoding as the live media program is being received;

encoding, by the computer, a plurality of different copies of the live media program in real time as the live media program is received by the computer, each copy being encoded with different encoding parameters from the other copies so that the different copies each represent the same media program with different video qualities;

delivering, by the computer, a number of media streams each representing one of the different copies of the media program to the plurality of client devices via the network;

receiving feedback about the delivery of the media streams at the computer; and adapting, by the computer, the number of media streams of the media program that are encoded by the computer in response to the received feedback so that encoding of the more popular streams is continued while encoding of less popular streams is suspended, wherein the adapting comprises the computer providing a message to client devices previously receiving a suspended stream that redirects those client devices from the suspended stream to an alternate one of the plurality of streams available from the computer that represents another of the different copies of the same live media program that was contained in the suspended stream, but that is encoded with a different video quality than the suspended stream.

2. The method of claim 1 wherein each of the plurality of different copies of the live media program is encoded in real time with a different bit rate.

3. The method of claim 1 wherein the adapting comprises making fewer streams of the media program available when the feedback indicates a decrease in available bandwidth.

4. The method of claim 3 wherein the redirecting comprises the computer providing an HTTP code that allows the client devices previously receiving the suspended stream to automatically request future content of the media program from the alternate stream with no perceived interruption in the playback of the media program.

5. The method of claim 1 wherein the encoding of the plurality of different copies is performed in real time by the computer as the multiple media streams are delivered to the client devices.

6. The method of claim 1 wherein the feedback comprises demand information describing a real-time demand for the media program, and wherein the adapting comprises discontinuing encoding of at least one stream of the media program if the real-time demand is less than a threshold value.

7. The method of claim 6 wherein the feedback is provided by a multicast delivery server, and wherein the adapting comprises communicating with the multicast delivery server to suspend the delivery of the at least one stream of the media program.

8. The method of claim 1 wherein the delivering comprises providing segments of the streams in response to HTTP requests received from the client devices via the network.

9. The method of claim 8 wherein the adapting comprises responding to the HTTP requests for the segments of suspended streams by providing an HTTP code in the message indicating the alternate stream for the same content that is contained in the suspended stream.

10. The method of claim 9 wherein the HTTP code allows the client devices to automatically request future content of the media stream from the alternate stream with no perceived interruption in the playback of the media stream.

11. A computer system having a processor and a memory, wherein the processor is configured to adaptively manage the encoding and multicast delivery a live media program that is encoded in real time into a plurality of streams, each stream having different encoding parameters than the other streams of the media program, and wherein the computer system is further configured to adaptively manage the encoding and multicast delivery of the live media program by:
  receiving the live media program by the computer system for encoding as the live media program is being received;
  encoding the live media program in real time as the live media program is received to create a plurality of different streams of the live media program, each stream being encoded with different encoding parameters from the other streams so that the different streams each represent the same live media program with different video qualities;
  delivering segments associated with each of the streams in response to requests received from a plurality of client devices via a network;
  monitoring the number of requests received for each of the plurality of streams associated with the live media program; and
  adapting the number of streams that are encoded for the live media program in response to the monitored number of requests by suspending the encoding of one or more streams that has lower demand than other streams, and by providing a message to the client devices receiving the one or more suspended stream that redirects those client devices from the suspended stream to an alternate one of the plurality of streams available from the computer system that encodes the same live media program that was contained in the suspended stream but with different encoding parameters than the suspended stream.

12. The computer system of claim 11 wherein segments of the streams are delivered in response to HTTP requests received from client devices.

13. The computer system of claim 12 wherein the adapting comprises responding to the HTTP requests for the segments of suspended streams by providing an HTTP code as part of the message.

14. The computer system of claim 13 wherein the HTTP code indicates the alternate stream for the same content contained in the suspended stream to thereby allow the client device to automatically request segments of the alternate stream instead of the suspended stream.

15. A data processing system comprising:
  an encoding system configured to produce a plurality of streams of a live media program in real time as the live media program is received by the encoding system, wherein each of the plurality of streams represents a copy of the same live media program encoded using a different encoding parameter;
  a multicast delivery system configured to provide multicast delivery of the plurality of streams to each of a plurality of clients, to monitor the multicast delivery of the plurality of streams, and to provide feedback about the monitored delivery of the plurality of media streams; and
  a resource management system configured to receive the feedback about the monitored delivery of the plurality of media streams and, responsive to the feedback, to adapt the number of the plurality of media streams representing the media program that are encoded by the multicast delivery system by suspending the encoding of at least some of the media streams and by providing messages to the clients that previously received suspended streams, wherein the messages redirect those clients from the suspended stream to an alternate one of the plurality of streams available from the multicast delivery system that continues to encode the same live media program that was contained in the suspended stream, but with different encoding parameters than the suspended stream.

16. The data processing system of claim 15 wherein the feedback describes demand for each of the plurality of media streams representing the media program, and wherein the resource management system is configured to adapt the plurality of media streams by directing the multicast delivery system to temporarily suspend the encoding of streams of the media program having demand below a threshold.

17. The data processing system of claim 16 wherein the streams are delivered in response to HTTP requests received from clients, wherein the multicast delivery system suspends delivery of the streams having demand below the threshold by responding to the HTTP requests with an HTTP code in the message indicating that the suspended stream is no longer available, and wherein the HTTP code indicates the alternate stream for the same content contained in the suspended stream to thereby allow the clients to automatically request segments of the alternate stream instead of the suspended stream from the multicast delivery system.

* * * * *